United States Patent
Williams

(10) Patent No.: US 6,700,974 B1
(45) Date of Patent: Mar. 2, 2004

(54) SWITCHING POWER SUPPLY FOR GENERATING A RINGING VOLTAGE

(75) Inventor: H. Ross Williams, Madison, AL (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/397,413

(22) Filed: Sep. 16, 1999

(51) Int. Cl.[7] .............................. H04M 1/00; H04M 9/00
(52) U.S. Cl. .................... 379/399.01; 379/93.05; 379/198; 379/382; 379/413.01
(58) Field of Search .................. 379/399.01, 399.02, 379/413.01, 387.01, 373.01, 382, 93.05, 93.07, 198, 199, 382.01

(56) References Cited

U.S. PATENT DOCUMENTS

| | | | |
|---|---|---|---|
| 3,649,769 A | | 3/1972 | Pest .......................... 179/77 |
| 4,056,689 A | | 11/1977 | Freimanis ................ 179/16 F |
| 4,423,292 A | | 12/1983 | Turek .................... 179/18 AH |
| 4,551,670 A | | 11/1985 | Anders et al. ............. 323/281 |
| 4,679,232 A | | 7/1987 | Brooks et al. ............. 379/413 |
| 5,133,006 A | * | 7/1992 | Khuat ....................... 379/399 |
| 5,157,711 A | | 10/1992 | Shimanuki ................. 379/67 |
| 5,740,241 A | * | 4/1998 | Koenig et al. ......... 379/399.01 |
| 5,832,240 A | * | 11/1998 | Larsen et al. .............. 395/285 |
| 5,970,139 A | * | 10/1999 | Koenig et al. ............. 379/413 |
| 6,081,586 A | * | 6/2000 | Rahamim et al. ........ 379/93.29 |
| 6,111,949 A | * | 8/2000 | Sheets et al. .............. 379/414 |
| 6,212,272 B1 | * | 4/2001 | Herschler et al. ........... 379/399 |
| 6,359,973 B1 | * | 3/2002 | Rahamim et al. ........ 379/93.05 |
| 6,456,703 B1 | * | 9/2002 | Lee .......................... 379/93.09 |
| 6,542,584 B1 | * | 4/2003 | Sherwood et al. ........ 379/88.18 |
| 6,567,399 B1 | * | 5/2003 | Schuster et al. ............ 370/352 |

OTHER PUBLICATIONS

*4A High Efficiency Switching Regulators*, Linear Technology Corporation (Jul. 1998).
*EIA/TIA–496–A Interface between Data Circuit–Terminating Equipment (DCE) and the Public Switched Telephone Network (PSTN)*, Electronic Industries Association, pp. 11–22, and 42–70 (Sep. 28, 1999).

* cited by examiner

*Primary Examiner*—Binh Tieu
(74) *Attorney, Agent, or Firm*—Akin Gump Strauss Hauer & Feld LLP

(57) ABSTRACT

An apparatus and method for providing a ringing voltage to a communication device such as a telephone or a modem. Typically, communication devices are coupled to a ringing voltage providing telephone network, such as a Plain Old Telephone Service (POTS) network. The POTS network generally provides the necessary ringing voltages to the communication device. However, in other telephone networks, such as a PBX system, ringing voltages are not provided by the telephone network. The apparatus provides ringing voltages to the communication devices coupled to the non-ringing voltage providing telephone networks. The apparatus includes a switching regulator that provides the necessary ringing voltages to an indicator such as a bell or other output indicator.

7 Claims, 6 Drawing Sheets

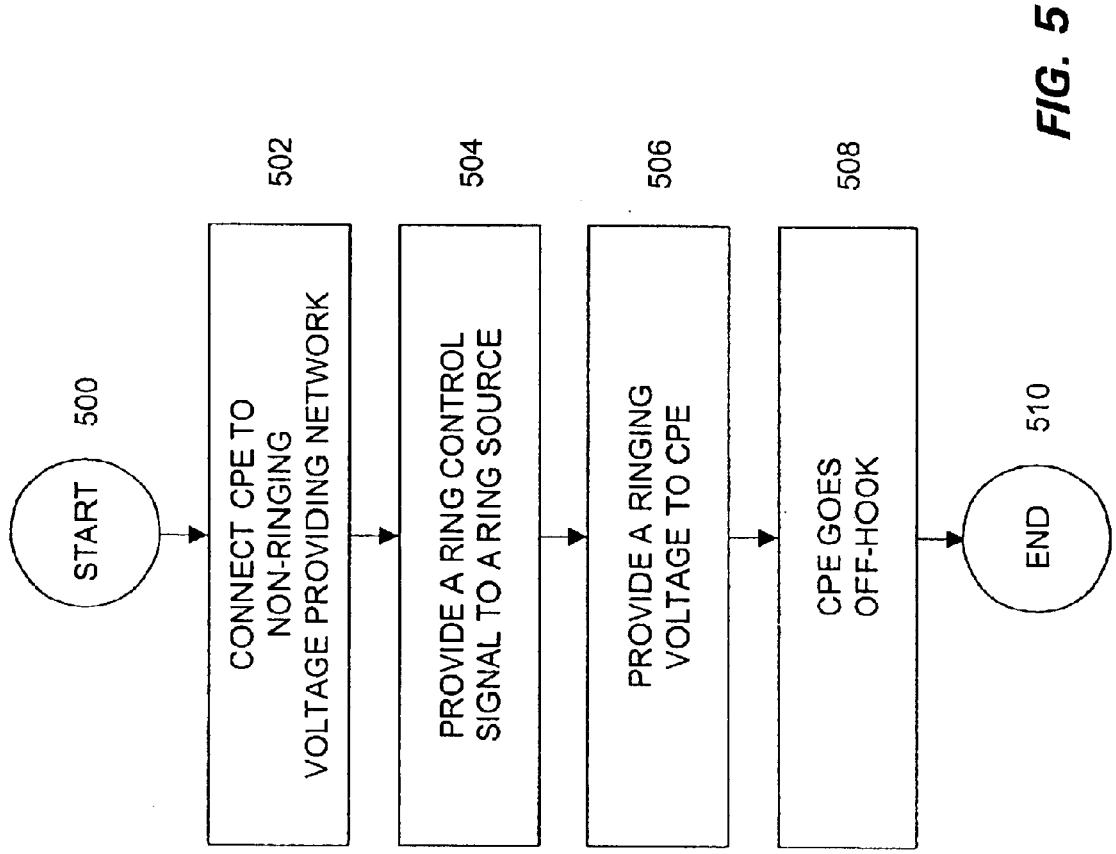

SWITCHING POWER SUPPLY FOR GENERATING A RINGING VOLTAGE

BACKGROUND

1. Field of the Invention

The present invention relates to an apparatus for communication devices, in particular and apparatus for generating a ringing voltage.

2. Description of the Related Art

Communications devices, such as modems, employ digital processing techniques to transmit data over a band-limited communications channel, such as the Public Switched Telephone Network (PSTN). Generally, to transmit data over the PSTN, a modem modulates the binary data and then transmits the data over the band-limited communications channel. A receiving modem is coupled to the band-limited communications channel, and receives the binary data and demodulates the binary data.

Generally, the modem is in an idle state until it is ready to transmit or receive data. When the modem is ready to transmit data to the PSTN, the modem begins a connect process. Similarly, when the modem needs to receive data from the PSTN, the modem goes through a call set-up process.

Modems are typically designed to operate on the PSTN. Several types of services are available on the PSTN, such as plain old telephone services (POTS), Integrated Services Digital Network (ISDN) services, or x Digital Subscriber Line (xDSL) services. The communication devices that are intended to operate on the PSTN, are generally subject to an interface standard. The interface standard for the United States is specified in EIA/TIA-496-A (1998). The standard establishes technical requirements for interfacing and connecting a communication device to the PSTN for purposes of data transmission. The communication device's compliance with these requirements is generally intended to assure minimum acceptable compatibility with the PSTN.

As mentioned previously, the modem is in an idle state until it is ready to send or receive data. Typically, the modem while in the idle state is on-hook. Should another communication device wish to transmit data to the receiving modem, the PSTN will initiate a call setup by providing a ringing voltage to the receiving modem. The electrical characteristic of the ringing voltage is specified in the EIA/TIA standard. Once the receiving modem receives the ringing voltage from the PSTN, the receiving modem can either remain on-hook or go off-hook and begin receiving the data. Off-hook refers to an operating state of the communication device in which a communication link is enabled for voice communication, data communication or network signaling. On-hook refers to an operating state of the communication device in which a communication link is disabled.

Other networks, such as a PBX system, may not provide the necessary ringing voltage to the modem for call setup. Typically, the communication devices coupled to the PBX system generally use digital controls signals for the call setup process. These communication devices tend to be more complex, and therefore more expensive than those communication devices that use the ringing voltage for the call setup process.

SUMMARY OF THE INVENTION

Briefly, an apparatus provides a ringing voltage to an Analog Front End (AFE) of a communication device while the device is in an on-hook state. The apparatus provides the necessary circuitry for connecting a communication device, such as a modem or a telephone, with a telephone network, such as a PBX system. When the communication device is in the on-hook state, the apparatus can provide a ringing voltage to the AFE when the communication device is coupled to a telephone network that does not provide the ringing voltage. The apparatus may be incorporated into the communication device, or be a stand-alone device coupled to the communication device. This apparatus is used to provide a ringing voltage to the communication devices coupled to a telephone network that does not provide the ringing voltage.

BRIEF DESCRIPTION OF THE DRAWINGS

A better understanding of the present invention can be obtained when the following detailed description of the preferred embodiment is considered in conjunction with the following drawings, in which:

FIG. 5 is a flow chart of a technique of providing a ringing voltage to a non-Ringing Voltage Providing telephone network.

DETAILED DESCRIPTION OF PREFERRED EMBODIMENT

Figure 1:
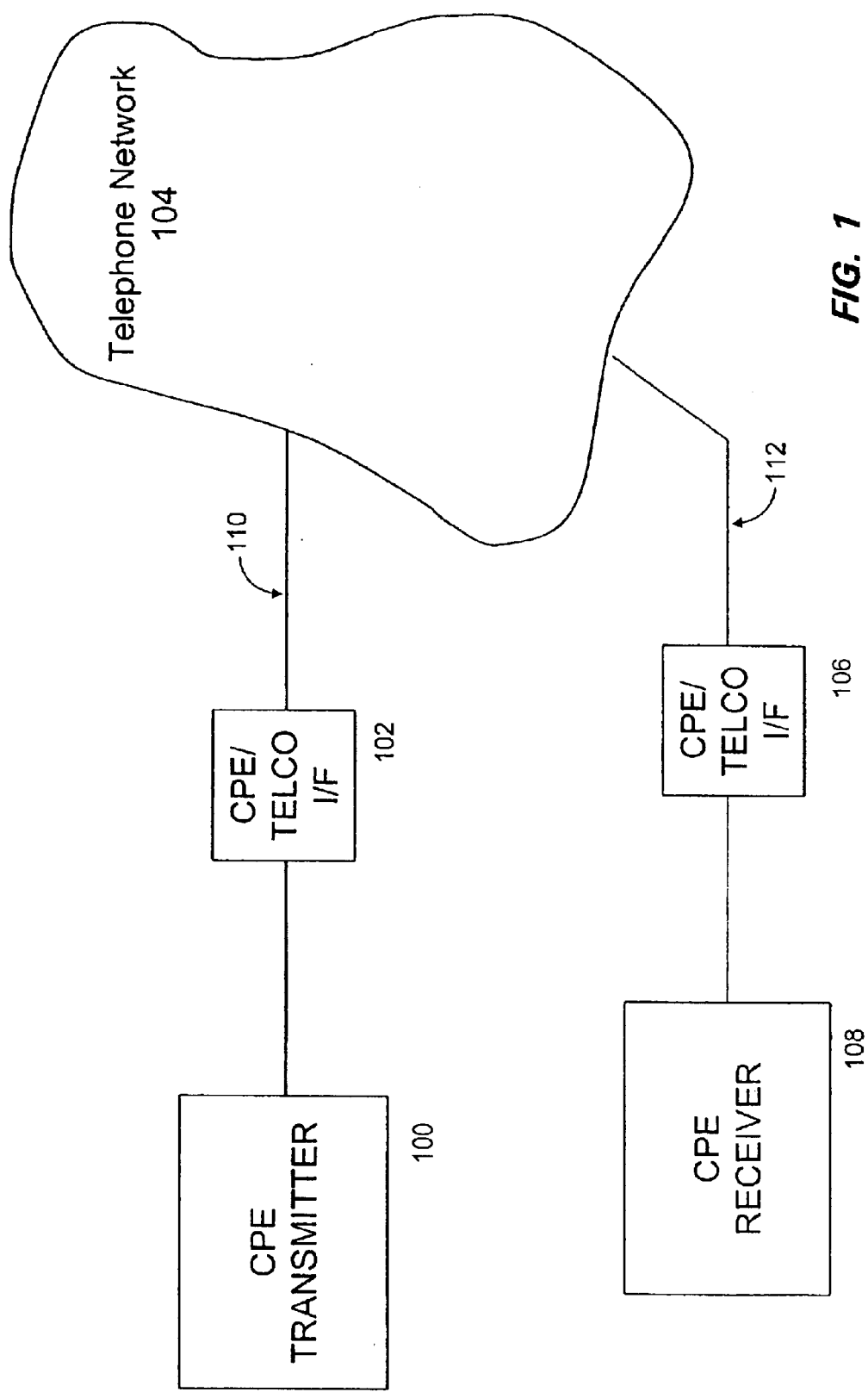
FIG. 1 is a block diagram of a transmitter and a receiver coupled to a Plain Old Telephone Service (POTS) network.

Turning now to drawings, FIG. 1 is a block diagram of a transmitter and receiver coupled to a telephone network, such as Plain Old Telephone Service (POTS) network of a PSTN. A transmitter 100 is coupled to a Customer Premise Equipment/Telephone Company (CPE/TELCO) interface 102, such as a wall jack (e.g., an RJ-11 jack). The interface 102 generally represents the boundary between the customer and the TELCO. Various CPEs are connected to a TELCO central office switch (CO) (not shown). The CO is then coupled to a telephone network 104. A receiving end is also coupled to the telephone network 104 by its corresponding central office (not shown). An interface representing the boundary of the customer premise and TELCO is represented by an interface 106 which couples the CO and a receiver 108.

The CPE typically include communication devices, such as a modem or a telephone. The CPE typically adheres to interface standards. The interface standards typically provide physical size and electrical loading requirements necessary for the CPE to operate at a defined quality of service. Without the standards, it is possible that a customer premise equipment may not function when coupled to the telephone network, nor perform at optimal levels.

The CPE interface standards vary from country to country, or region to region. Thus, it is possible that a CPE designed for use in the United States would not function when coupled to a telephone network in England. Furthermore, it may be possible that the CPE may be damaged when coupled to the non-standard complying telephone interface.

Figure 2A:
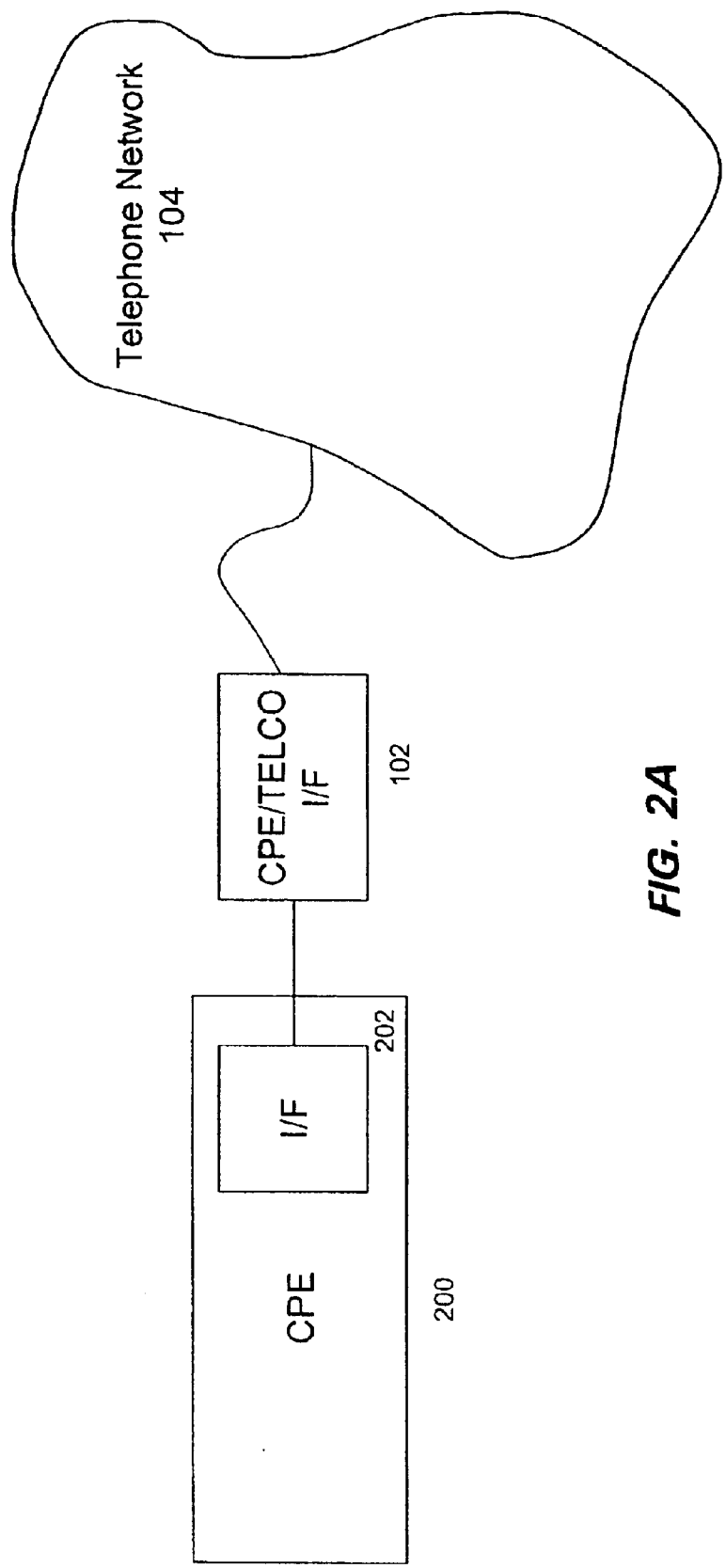
FIG. 2A is a block diagram of a communication system including a telephone interface.

FIG. 2A is a block diagram of a telephone network using a telephone interface. A CPE, such as a modem, is coupled to a telephone interface 202. The telephone interface 202 can be incorporated into the CPE 200 or the telephone interface 202 can be a stand-alone device coupled to the CPE 200. An CPE/TELCO interface 102 illustrates the boundary between the customer premises and the telephone company. The CPE/TELCO interface 102 is coupled to a telephone network 104, such as a Plain Old Telephone Service (POTS) network, an x Digital Subscriber Line (xDSL) network, or an Integrated Services Digital Network (ISDN). Depending upon the telephone network 104, the CPE 200 is coupled to the CPE/TELCO interface 102, and typically adheres to a variety of standards, including an electrical interface standard.

As mentioned previously, the electrical interface standard varies from region to region. For example, in the United States, the interface standard is EIA/TIA-496-A (1989). The electrical ringing voltage requirement specified in the EIA/TIA-496-A (ELA/TIA) standard varies from approximately 16 Hz to 40 Hz at voltages from approximately 40 VRMS to 200 VRMS (Voltage Root Meaned Squared). Should a request be made for a receiving communication device to receive data, the telephone network 104 provides the ringing voltage to the receiving communication device.

Figure 2B:
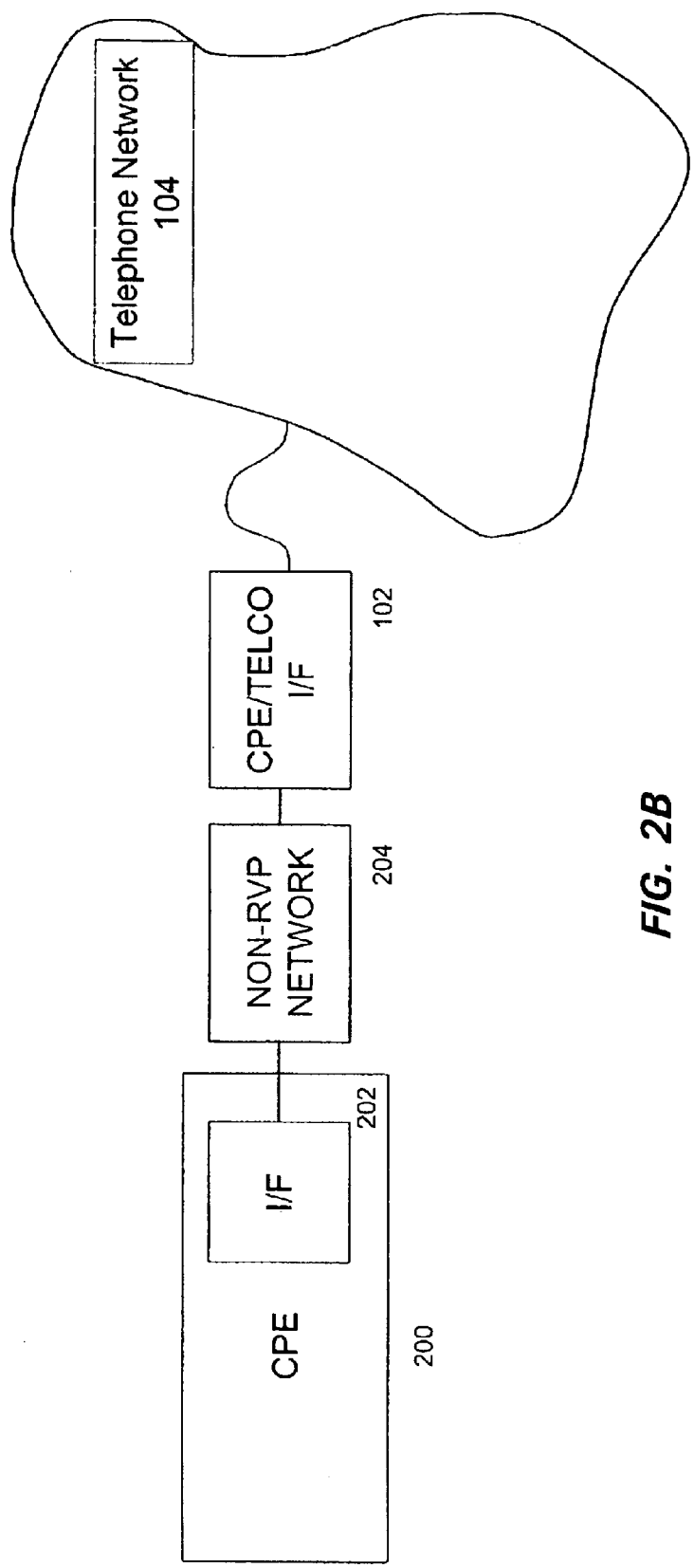
FIG. 2B is a block diagram of a communication system including a non-Ringing Voltage Providing (n-RVP) telephone network.

FIG. 2B is a block diagram of a non-ringing voltage providing (n-RVP) telephone network using a telephone interface. The CPE 200 includes an interface 202 and is coupled to a n-RVP telephone network 204. The n-RVP telephone network 204 could include a PBX system or other non-telephone company equipment The n-RVP telephone network 204 is also coupled to the CPE/TELCO interface 102. The CPE/TELCO interface 102 is also coupled to the telephone network 104. Voice, data, and signaling signals are typically transmitted over the telephone network 104. Central Offices (not shown) are part of the telephone network 104. The telephone network 104 typically includes a number of switching offices, such as the Central Office. The Central Office is typically the first switch encountered by the CPE 200 in the telephone network 104. Besides voice, data and signaling information, the Central Office typically provides a ringing voltage to the CPE 200. In contrast, the n-RVP telephone network 204 does not provide the ringing voltage to the CPE 200 from the Central Office.

Figure 3:
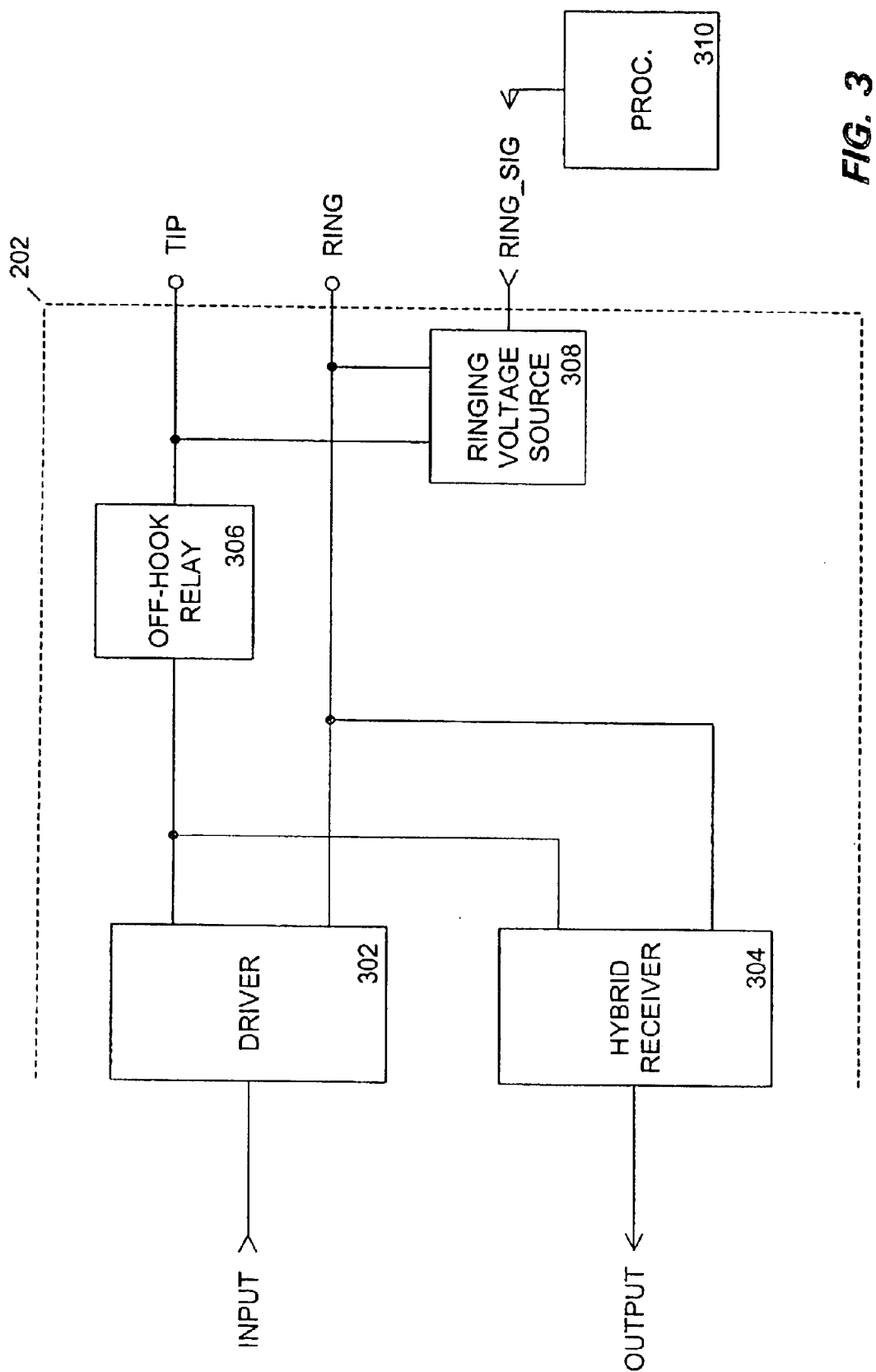
FIG. 3 is a block diagram of a telephone interface.

FIG. 3 is a block diagram of a telephone interface. The telephone interface 202 is typically part of an Analog Front End (AFE) of CPE 200. The telephone interface 202 generally includes a driver 302, a hybrid receiver 304, an off-hook switch 306, and a ringing voltage source 308. An INPUT and an OUTPUT are typically coupled to a Coder/Decoder (CODEC) (not shown). The off-hook relay 306 is coupled serially to the TIP line. Note, the off-hook relay 306 could alternatively be coupled serially to the RING line. The off-hook relay 306 is typically open when the CPE 200 is in the off-hook state. When the CPE 200 is in the on-hook state, a control signal is sent to the off-hook relay 306 and the off-hook relay 306 closes coupling the interface 202 with the n-RVP telephone network 204. The OUTPUT of the CODEC is generally provided to the input of the driver 302. The outputs of the driver 302 are coupled to the off-hook relay 306 and the hybrid receiver 304. Typically, part of the output of the driver 302 is provided to the telephone network 104 via TIP and RING lines when the CPE 200 is in the off-hook state. The hybrid receiver 304 generally provides a rejection of the transmit signals from the driver 302, while providing receive signals from the telephone network 104 to the INPUT of the CODEC.

The ringing voltage source 308 is coupled between the TIP and RING lines. When the voltage ring source 308 receives a RING_SIG signal from a processor 310, the voltage ring source 308 provides a ringing voltage to the TIP and RING lines. The processor 310 generally provides the RING_SIG signal which can be a digital signal, which can be a digital generated analog signal.

Figure 4:
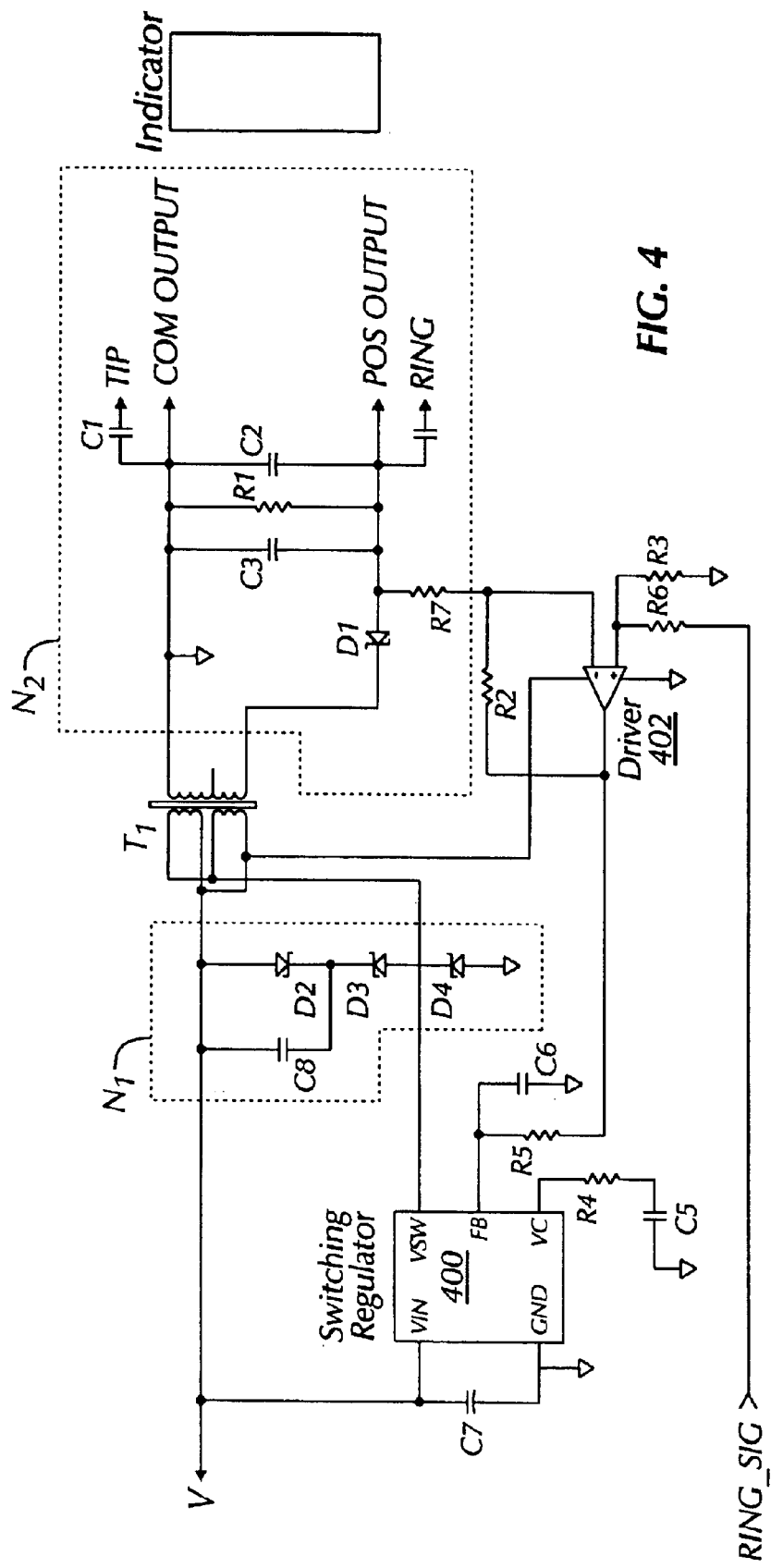
FIG. 4 is a circuit diagram of a telephone interface.

FIG. 4 is an exemplary circuit diagram of the telephone interface. The ringing voltage source 308 includes a power supply or a switching regulator 400, such as a Linear Technology of Milpitas, Calif., Model 1269 switching regulator, a driver 402, such as a Texas Instruments, Inc. (Dallas, Tex.) model TL081 operational amplifier and various resistors, capacitors, and diodes. The switching regulator 400 is coupled to the TIP and RING lines via a transformer T1. When the RING_SIG signal such as a sine input is provided to the driver 402, an output VSW of the switching regulator 400 provides the ringing voltage to the TIP and RING lines. The driver 402 also provide the necessary feedback to the switching regulator 400 so that the ringing voltage is produced by the switching regulator 400. The transformer T1 provides a necessary isolation as specified in the EIA/TIA standard between the voltage ring source 308 and the TIP and RING lines. The ringing voltage source 308 typically provides a ringing voltage having a voltage ring of 80 volts peak-to-peak at 20 hertz RMS to an indicator of the CPE (not shown). The indicator of the CPE could include a transducer, such as a bell, or a logic circuit coupled to a processor.

A circuit network N1 includes capacitor C8, diodes D2, D3 and D4. The network N1 generally provides switching transient clamping to protect the switching regulator 400. A circuit network N2 includes capacitors C1, C2, C3, C4, resistors R1, R7, and a diode D1. The circuit network N2 generally provides rectification (D1) and filtering (C3) and loading (R1) so that a generally smooth AC waveform is generated. This waveform typically will be a sine wave or a clipped trapezoid, both of which are of standard use. The capacitors C1 and C2 couple the AC energy to the line while providing DC isolation.

It should be understood that the ringing voltage source 308 shown in FIG. 4 could be implemented in a variety of ways. Also, the telephone interface can be implemented in other ways than that shown in FIG. 4.

Next, FIG. 5 is a flow chart of a technique of providing a ringing voltage to a non-Ringing Voltage Providing (n-RVP) telephone network. The technique starts at step 500. The CPE 200 is connected to an n-RVP telephone network 204 at step 502. The n-RVP telephone network 204 provides a ring control signal to a ringing voltage source at step 504. The ringing voltage source provides a ringing voltage to the CPE 200 at step 506 in response to the ring control signal. The CPE 200 goes off-hook at step 508 in response to the ringing voltage. The technique ends at step 510.

As discussed previously, the CPE 200 can typically be used with various telephone networks, including a PBX system. Typically, communication devices designed for interfacing directly to a Ringing Voltage Providing telephone network, such as a POTS network, are relatively inexpensive to design and manufacture. In contrast, communication devices designed for use with the PBX systems are more complex, thus are more expensive. Among other things, this disclosure provides an apparatus for interfacing these communication devices with telephone networks that do not provide a ringing voltage. Further, in accordance with the disclosed techniques, the non-ringing voltage providing telephone networks can perform call set-up using a ringing voltage.

The foregoing disclosure and description of the various embodiments are illustrative and explanatory thereof, and various changes in the size, shape, materials, components, circuit elements, wiring connections and contacts, as well as in the details of the illustrative circuitry and construction and method of operation may be made without departing from the spirit of the invention.

I claim:

1. A modem adapted for use with a non-ringing voltage producing (n-RVP) telephone network, comprising:
   an analog front end (AFE) circuitry adapted to perform communication functions;
   a RING conductor coupled to the AFE circuitry;
   a TIP conductor coupled to the AFE circuitry; and
   a feedback-controlled ringing voltage source, coupled to the RING conductor and the TIP conductor, the ringing voltage source adapted to generate a ringing voltage on the RING conductor and the TIP conductor responsive to a ring control signal from the n-RVP telephone network.

2. The modem of claim 1, the ringing voltage source comprising:
   a ring control signal line, couplable to the n-RVP telephone network and adapted to receive the ring control signal;
   a switching regulator adapted to generate an output signal on an output signal line coupled to the RING conductor and the TIP conductor; and
   a feedback circuit, coupled to the switching regulator and the ring control signal line,
   wherein the switching regulator is adapted to place a ringing voltage on the output signal line responsive to feedback from the ring control signal and the output signal.

3. The modem of claim 2, wherein the feedback circuit is adapted to modulate the output signal on the output signal line responsive to the ring control signal.

4. The modem of claim 1, wherein the ring control signal is an AC signal.

5. The modem of claim 1, further comprising:
   a DC input voltage, coupled to an input of the switching regulator and coupled to the RING conductor and the TIP conductor.

6. The modem of claim 1, the feedback circuit comprising:
   an operational amplifier, an output of the operational amplifier coupled to a feedback input of the switching regulator, a first input of the operational amplifier coupled to the ring control signal line, and a second input of the operational amplifier coupled to the RING conductor and the TIP conductor.

7. The modem of claim 1, wherein the n-RVP telephone network is a private branch exchange.

* * * * *